UNITED STATES PATENT OFFICE.

FRITZ ACH, OF MANNHEIM, GERMANY, ASSIGNOR TO THE FIRM OF C. F. BOEHRINGER & SOEHNE, OF MANNHEIM-WALDHOF, BADEN, GERMANY.

DIACETYL-DIAMIN AND PROCESS OF MAKING SAME.

SPECIFICATION forming part of Letters Patent No. 708,512, dated September 9, 1902.

Application filed May 1, 1901. Serial No. 58,335. (Specimens.)

*To all whom it may concern:*

Be it known that I, FRITZ ACH, a citizen of the Empire of Germany, residing at Mannheim, in the Empire of Germany, have invented certain new and useful Improvements in Diacetyl-Diamins and Methods of Preparing the Same; and I do hereby declare the following to be a full, clear, and exact description of the invention, such as will enable others skilled in the art to which it appertains to make and use the same.

The present invention relates to the preparation of diacetyl derivatives of diamins which are to be employed as starting materials for the manufacture of pharmacal products. The said invention involves the action of acetic anhydrid on uric acid. As the result of such reaction 8-methyl-xanthin is obtained as a final product, as has been shown in my United States Patent No. 667,381, dated February 5, 1901, where said final product and the mode of preparing same is described, while at the same time the diacetyl derivative of a diamin having the amido groups bound on the neighboring C atoms is formed, as I have found, which diacetyl derivative may be isolated or separated if the process is properly conducted. This separation of the diacetyl derivative also forms an important feature of my invention. The said intermediate product is formed from the uric acid by breaking up the five-ring and concurrent splitting off of carbon dioxid. It follows from its manner of formation that it must be designated "4-5-diacetyl-diamido-uracyl" or "4-5-diacetyl-diamido-2-6-dioxy-pyrimidin." It is formed coincidently with 8-methyl-xanthin if uric acid is boiled together with acetic anhydrid only until a sample of the difficultly-soluble product of the reaction ceases to reduce an ammoniacal silver solution on warming for a brief period of time. The product so obtained will consist namely of 4-5-diacetyl-diamido-uracyl, whose formation may be explained by the following equation:

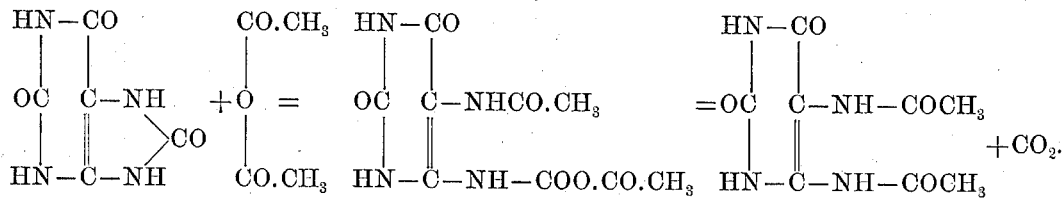

Although the above reaction will suffice to produce the diacetyl-diamido-uracyl, the formation of the same may be hastened by the presence of a suitable condensing agent, such as quinolin, dimethyl-anilin, pyridin. The methyl-xanthin, which is always concurrently formed, may be readily separated by virtue of its insolubility in water. It should be observed, moreover, that an excess of acetic anhydrid will act on the diacetyl derivative in such a way as to give rise to a triacetyl body (triacetyl-diamido-uracyl) as a secondary product having the composition denoted by the formula $C_{10}H_{12}N_4O_5$ and which may be separated from the 8-methyl-xanthin and the more difficultly-soluble diacetyl compound by rapid boiling with water. This triacetyl compound may be converted into diacetyl-diamido-uracyl by saponification, which saponification may be effected by merely boiling with water, but may be expedited by adding weak base or acid. Thence this triacetyl product can be isolated only when observing particular precautions whenever acetic anhydrid reacts on uric acid in the presence of pyridin.

I will now describe in detail what I consider the preferable manner of carrying out my invention.

Ten parts of uric acid are boiled together with thirty parts acetic anhydrid and five parts of pyridin in a reflux apparatus until the difficultly-soluble resultant product ceases to reduce an ammoniacal silver solution on boiling for a brief period of time. This condition is reached after heating for about fifteen hours. The liquor is then drained from the product of the reaction by siphoning or otherwise, and the residual brownish crystalline powder is then boiled with about thirty times its quantity of water. By this procedure 8-methyl-xanthin, which has been formed in a finished condition during the course of the reaction, is left as a difficultly-soluble residue, while 4-5-diacetyl-diamido-uracyl goes into solution, which is separated by filtration, draining, or otherwise. On evaporating this aqueous solution the new diacetyl derivative is obtained in the form of fine colorless needles, the yield corresponding to about seventy-five per cent. of the uric acid employed. If we heat ten parts of uric acid with thirty parts of acetic anhydrid without adding pyridin or other condensing agent, it will be necessary to boil the mixture for about forty-eight hours before the resultant product will cease to reduce ammoniacal silver solution on heating briefly. The crude product obtained in this way is also boiled several times with water, as set forth in the first example; but in the last example the boiling with water must be continued for a somewhat longer space of time in order to effect a complete saponification of the concurrently-formed triacetyl product referred to hereinabove. To completely purify the product, it is advisable to redissolve and recrystallize the same from boiling water, whereby the diacetyl body is obtained in the form of fine needles felted in the manner of asbestos or radially aggregated. From an analysis of the same it has the formula $C_8H_{10}N_4O_4$ and according to its mode of formation the structural formula

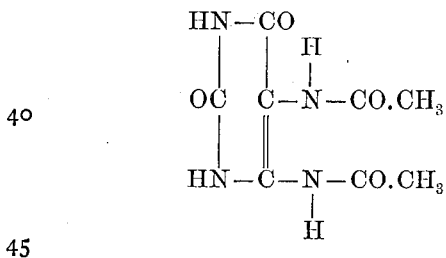

should be assigned to it.

4-5-diacetyl-diamido-uracyl is readily soluble in alkalies including ammonia. On evaporating or boiling the same down with concentrated hydrochloric acid it gives a direct and very strong murexide reaction without the addition of an oxidizing agent. An ammoniacal silver solution will be reduced by the same only after boiling for a considerable time. This diacetyl derivative possesses no melting-point. From 300° centigrade on it sinters or softens and at the same time attains a brown color and gradually decomposes at higher temperatures. If the same is treated with an alkali, one of the acetyl radicals is split off and it is converted into mono-acetyl-diamido-uracyl having the composition indicated by the formula $C_6H_8N_4O_3$.

As before stated, the new compound serves as a starting material in the preparation of pharmacal and medicinal compounds.

What I claim, and desire to secure by Letters Patent of the United States, is—

1. The process of preparing the herein-described uracyl derivatives which consists in heating a uric acid together with an organic acid anhydrid until the product of the reaction will not reduce an ammoniacal silver solution except by prolonged boiling.

2. The process of preparing the herein-described uracyl derivatives which consists in heating a uric acid together with an organic acid anhydrid under pressure until the product of the reaction will not reduce an ammoniacal silver solution except by prolonged boiling.

3. The process of preparing the herein-described uracyl derivatives which consists in heating a uric acid together with an organic acid anhydrid and a condensing agent until the product of the reaction will not reduce an ammoniacal silver solution except by prolonged boiling.

4. The process of preparing the herein-described uracyl derivatives which consists in heating a uric acid together with an organic acid anhydrid and a condensing agent under pressure until the product of the reaction will not reduce an ammoniacal silver solution except by prolonged boiling.

5. The process of preparing diacyl-diamins which consists in heating uric acid proper together with an organic acid anhydrid until the product of the reaction will not reduce an ammoniacal silver solution except by prolonged boiling.

6. The process of preparing diacyl-diamins which consists in heating under pressure uric acid proper together with an organic acid anhydrid until the product of the reaction will not reduce an ammoniacal silver solution except by prolonged boiling.

7. The process of preparing diacyl-diamins which consists in heating uric acid proper together with an organic acid anhydrid and a condensing agent until the product of the reaction will not reduce an ammoniacal silver solution except by prolonged boiling.

8. The process of preparing diacyl-diamins which consists in heating under pressure uric acid proper together with an organic acid anhydrid and a condensing agent until the product of the reaction will not reduce an ammoniacal silver solution except by prolonged boiling.

9. The process of preparing 4-5-diacetyl-diamido-uracyl which consists in heating uric acid proper together with acetic anhydrid until the product of the reaction will not reduce an ammoniacal silver solution except by prolonged boiling.

10. The process of preparing 4-5-diacetyl-diamido-uracyl which consists in heating uric acid proper together with acetic anhydrid and a condensing agent until the product of the reaction will not reduce an ammoniacal silver solution except by prolonged boiling.

11. The process of producing 4-5-diacetyl-diamido-uracyl which consists in heating uric acid proper together with acetic anhydrid and pyridin, until the product of the reaction will not reduce an ammoniacal silver solution except by prolonged boiling.

12. The process of producing 4-5-diacetyl-diamido-uracyl which consists in heating uric acid proper together with acetic anhydrid and pyridin under pressure until the product of the reaction will not reduce an ammoniacal silver solution except by prolonged boiling.

13. The process of producing 4-5-diacetyl-diamido-uracyl which consists in heating uric acid proper together with acetic anhydrid and pyridin under pressure until the product of the reaction will not reduce an ammoniacal silver solution except by prolonged boiling and then separating the diacetyl compound by boiling with water.

14. As a new chemical compound, a uric-acid derivative in which an acid radical and hydrogen are separately bound to the nitrogen atoms in the positions 7 and 9 of a uric acid, the CO group of the position 8 having been removed, the said compound being a diacetyl-diamin of a uric acid, giving a strong murexid reaction when evaporating with hydrochloric acid and reducing an ammoniacal silver solution only after prolonged boiling.

15. As a new chemical compound, 4-5-diacetyl-diamido-uracyl having the formula hereinabove given, which is readily soluble in alkalies including ammonia, which gives a strong murexid reaction on boiling with concentrated hydrochloric acid, without adding an oxidizing agent, which reduces ammoniacal silver solution only after boiling for a long time, which has no melting-point but sinters and turns brown at about 300°, centigrade, gradually decomposing on still further raising the temperature, and which may be crystallized in fine felted needles.

In testimony whereof I affix my signature in presence of two witnesses.

FRITZ ACH.

Witnesses:
  JACOB ADRIAN,
  H. W. HARRIS.